United States Patent [19]

Belliere

[11] 4,061,440

[45] Dec. 6, 1977

[54] DEVICE FOR CONTROLLING THE VARIATION IN PITCH OF THE BLADES OF A FAN

[75] Inventor: Pierre A. Belliere, Antibes, France

[73] Assignee: Ratier-Forest, Paris, France

[21] Appl. No.: 679,034

[22] Filed: Apr. 21, 1976

[30] Foreign Application Priority Data

Apr. 30, 1975 France .................................. 75.13500

[51] Int. Cl.² ............................................. B64C 11/38
[52] U.S. Cl. ................................. 416/157 R; 416/167
[58] Field of Search ................... 416/167, 160, 157 R, 416/165, 157 A; 60/226 R

[56] References Cited

U.S. PATENT DOCUMENTS

| | | | |
|---|---|---|---|
| 1,982,284 | 11/1934 | Briner | 416/160 |
| 2,440,046 | 4/1948 | Hautier | 416/160 |
| 2,679,299 | 5/1954 | Kelson | 416/160 |
| 2,954,830 | 10/1960 | Gehres | 416/167 X |
| 2,993,543 | 7/1961 | Allen | 416/157 |
| 3,825,370 | 7/1974 | McMurtry et al. | 416/160 |
| 3,873,235 | 3/1975 | Mendelson | 416/157 X |
| 3,891,346 | 6/1975 | Keenan et al. | 416/160 X |
| 3,900,274 | 8/1975 | Johnston et al. | 416/160 X |
| 3,901,626 | 8/1975 | McMurtry | 416/160 X |
| 3,922,852 | 12/1975 | Drabek | 416/167 X |

FOREIGN PATENT DOCUMENTS 772,115    10/1934    France .................................. 416/160

*Primary Examiner*—Everette A. Powell, Jr.
*Attorney, Agent, or Firm*—Holman & Stern

[57] ABSTRACT

Each fan-blade carries a bevel-pinion in mesh with two bevel ring-gears which are driven in rotation in opposite directions by means of two coaxial cylindrical tubular members. Carriages are mounted for axial motion within the space formed between the two tubular members; balls are fitted in helical grooves formed at opposite angles of slope in the internal and external cylindrical faces of the carriages and in corresponding helical grooves formed in the adjacent faces of the tubular members so as to form a ball-race. The moving member of at least one axial hydraulic jack constituting a motor is coupled to the carriages and the stationary member is coupled to the fan-shaft.

8 Claims, 5 Drawing Figures

DEVICE FOR CONTROLLING THE VARIATION IN PITCH OF THE BLADES OF A FAN

BACKGROUND OF THE INVENTION

This invention relates to the control of variation in pitch of the blades of a fan, especially the fan of a double-flow reactor.

A number of different systems have already been employed for this purpose. A first system comprises toothed racks disposed in an axial direction and in meshing engagement with pinions rigidly fixed to the fan blades; by displacing the toothed racks in sliding motion either in one direction or in the other, the pitch of the blades is either increased or decreased. A system of this type is attended by a number of disadvantages. In the first place it is cumbersome and in particular cannot be housed between the blades when these latter are present in large number and consequently placed very close together. In the second place the system is subject to a certain play in the gear-teeth and gives rise to components of tangential forces.

In another known system, each blade is rigidly fixed to a bevel-pinion disposed simultaneously in meshing engagement with two toothed rings which are coaxial with the fan assembly as a whole and driven in opposite directions in order to carry out the variation of pitch. In a system of this type, the play in the gear-teeth can be reduced to zero since these latter can be subjected to prestress at the time of assembly. This system is also less cumbersome than the toothed-rack systems. However, the ring-gears are driven in rotation by means of a motor, usually of the hydraulic type, by means of gear-trains in which the teeth fail frequently due to fatigue since they are subjected to a very high unitary pressure by reason of the high value of the couples to be transmitted, especially when the fan has a large number of blades.

SUMMARY OF THE INVENTION

The aim of the invention is to produce a device for controlling the variation in pitch of fan blades which is not attended by the aforementioned disadvantages of known devices.

Said device is of the type in which each fan-blade carries a bevel-pinion disposed continuously and simultaneously in mesh with two bevel ring-gears which are coaxial with the fan-shaft and coupled with a motor by means of a system for driving in rotation in opposite directions.

The device in accordance with the invention is distinguished by the fact that the system for driving the two bevel ring-gears in rotation in opposite directions comprises two coaxial cylindrical tubular members which are placed one inside the other with a predetermined space between them and are rigidly fixed respectively to the two bevel ring-gears; and carriages which are capable of moving axially within the space between the two coaxial cylindrical tubular members and each have a cylindrical external face and a cylindrical internal face located respectively opposite to the internal face of the outer cylindrical tubular member and to the external face of the inner cylindrical tubular member, there being formed in each face a helical groove in which balls are partially engaged, said balls being also partially engaged in an associated helical groove formed in the adjacent face of the corresponding cylindrical tubular member so as to form the active portion of a ball-race, the grooves being set at opposite angles of slope on the two faces of the carriage; the motor being constituted by at least one axial hydraulic jack in which the moving member is rigidly fixed to said carriages and the stationary member is rigidly fixed to the fan-shaft.

A device of this type is not subject to the disadvantages of bulk and of play in the gear-teeth of the rack and pinion systems of the prior art as recalled in the foregoing, nor to the disadvantage of entailing the need to make use of cumbersome gear-trains subjected to high stress rates as in the second known device mentioned in the foregoing.

In one embodiment, the motor is constituted by a single control jack which is coaxial with the fan unit as a whole and has a moving element to which all the carriages are coupled whilst in another embodiment the motor is constituted by a set of coaxial jacks disposed at uniform intervals about the axis of the fan and each having a moving element to which at least one carriage is coupled.

BRIEF DESCRIPTION OF THE DRAWINGS

A more complete understanding of the invention will be gained from the following description and from a study of the accompanying drawings in which a few forms of construction of control devices for variation of pitch in accordance with the invention are shown by way of example but not in any limiting sense, and in which.

DESCRIPTION OF THE PREFERRED EMBODIMENTS

Figure 1:
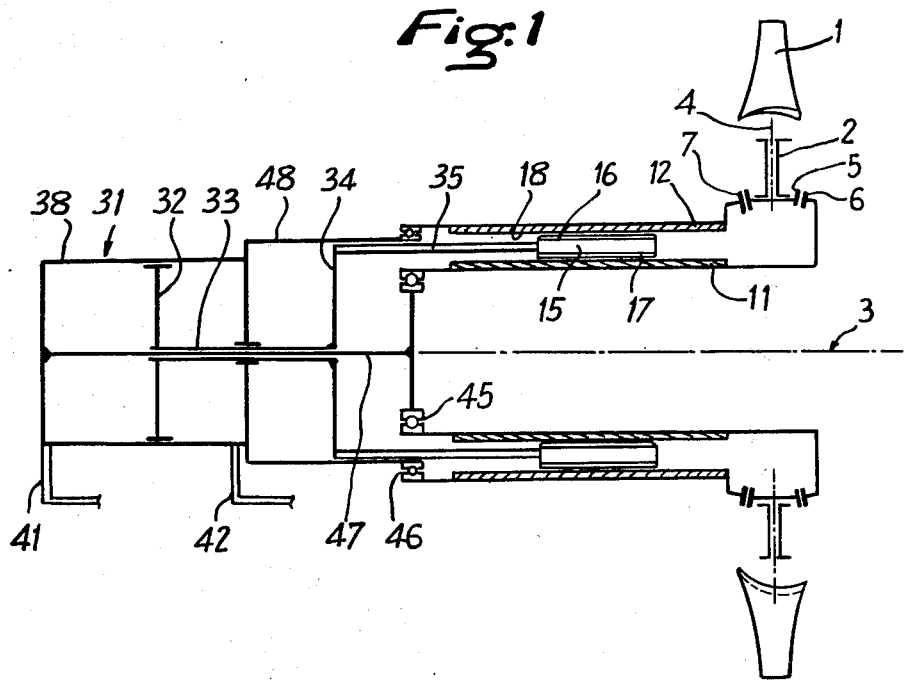
FIG. 1 is a diagrammatic longitudinal sectional view of a first embodiment.

The double-flow reactor fan which is shown only to a partial extent in FIG. 1 has a plurality of blades 1 carried by a ring 2 which is coaxial with the geometrical axis 3 of the fan in order to be capable of pivotal motion about geometrical axes 4 which are located at right angles to the axis 3, thus permitting modification of the blade pitch.

Each fan-blade 1 is secured to a bevel-pinion 5 which meshes simultaneously with two associated bevel ring-gears 6, 7, said gears being rigidly fixed respectively to an inner tubular member 11 and to an outer tubular member 12 which are rotatably mounted coaxially about the fan axis 3.

Figure 2:
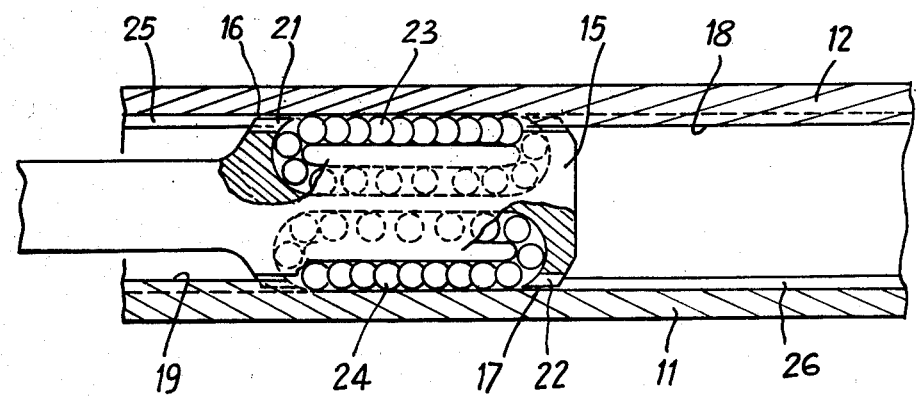
FIG. 2 is a view to a larger scale showing the main portion of the device of FIG. 1.
Figure 3:
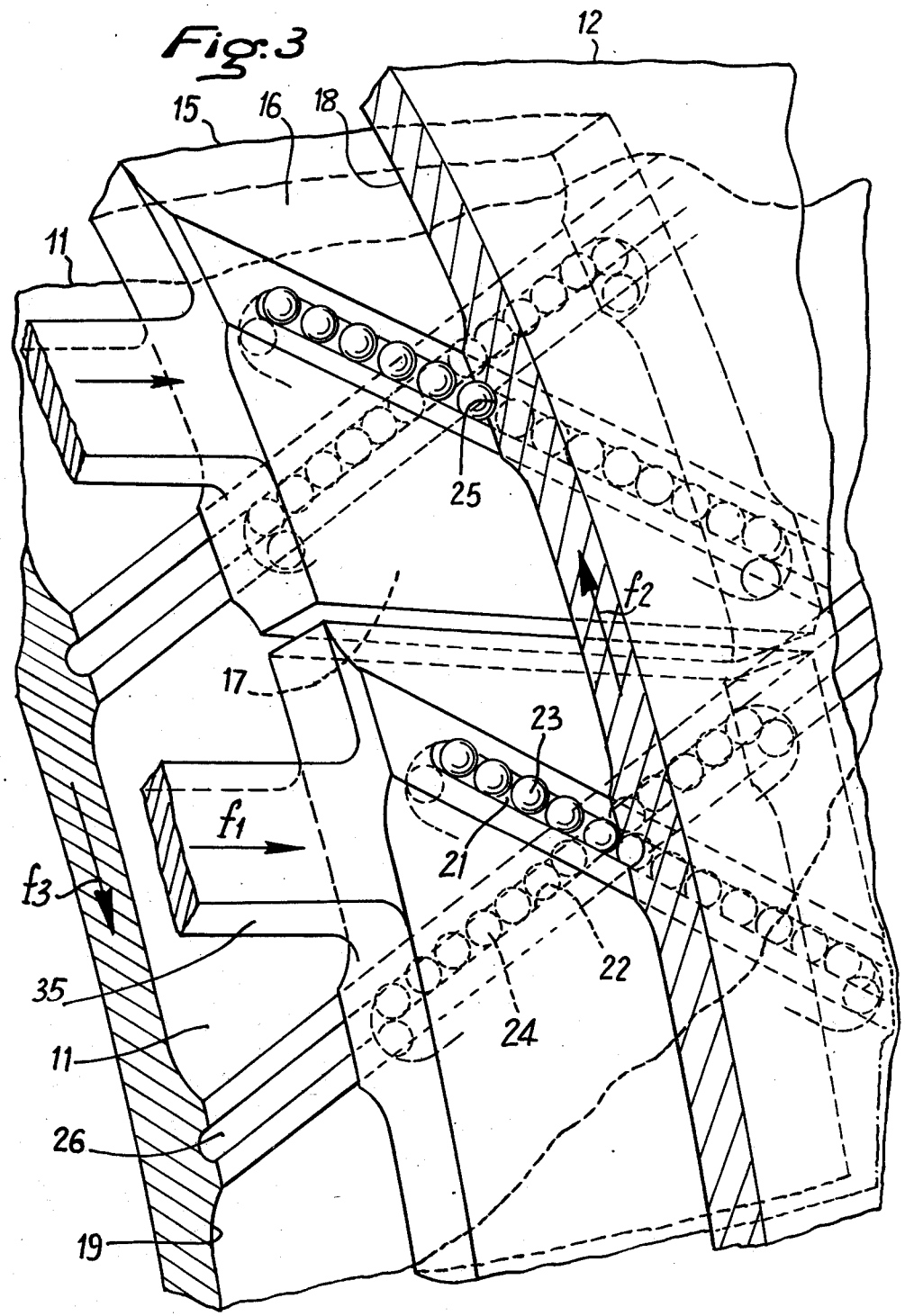
FIG. 3 is a cutaway view in perspective to an even larger scale showing that portion of the device which is illustrated in FIG. 2.

In order to produce a variation in the pitch of the fan blades 1, it is only necessary to rotate the two ring-gears 6, 7 and consequently the two coaxial tubular members 11, 12 in opposite directions and through the same angle. To this end, the two tubular members 11, 12 are mounted one inside the other so as to form a space of predetermined width between said members. Within said space are placed carriages 15 which are capable of axial motion and each have a cylindrical external face 16 (as also shown in FIGS. 2 and 3) and a cylindrical internal face 17 which are located opposite to the internal surface 18 of the outer cylindrical tubular member 12 and to the external surface 19 of the inner cylindrical tubular member 11. There is formed in each cylindrical face a helical groove 21, 22 in which are partially engaged balls 23, 24, said balls being also partially engaged in an associated helical groove 25, 26 formed in the adjacent face 18, 19 of the corresponding cylindrical tubular member so as to form the active face of a ball-race. On the two opposite faces of each carriage 15, the slopes of the helical grooves 21, 22 are of opposite direction as can be seen more clearly in FIG. 3. The return tracks of the ball-races are formed within the thickness of the carriage as shown in FIG. 2.

The different carriages 15 could also be constituted by corresponding zones of a common tubular member housed between the two coaxial cylindrical tubular members 11, 12.

A simultaneous axial displacement of all the carriages 15 therefore initiates pivotal movements of the two coaxial tubular members 11, 12 in opposite directions. The angles of slope of the ball-races are such that the amplitudes of angular movements of these two coaxial members are the same although the ball-races are located at different distances from the fan axis 3 in the two tubular members.

The simultaneous axial movements of all the carriages 15 are carried out by means of a hydraulic jack 31 which is coaxial with the fan. The moving member of said jack, namely the piston 32 in the example shown, is coupled by means of a tubular rod 33 to a star or a disc 34 to which are attached rods 35 having an axial direction and rigidly fixed respectively to the carriages 15. The cylinder 38 constitutes the stationary member of the jack 31 and provision is made at both ends of said cylinder for branch-pipe components 41, 42 which provide a communication between said cylinder and a distributor for selectively connecting two chambers of the jack to a source of oil under pressure or to the collector-tank.

The means for axial positioning of the two coaxial tubular members 11, 12 are shown diagrammatically in the form of two rings of balls 45, 46 retained respectively by a central rod 47 which passes through the tubular piston rod 33 and is secured to the bottom end of the jack cylinder 38 and by a shell 48 which is rigidly fixed to the jack cylinder 38.

The operation of this pitch-variation control device is very simple: depending on which of the two chambers of the hydraulic jack 31 is put under pressure, the displacement of the jack piston 32 is initiated and consequently the axial displacement of all the carriages 15 in either one direction or in the other. This consequently produces corresponding and simultaneous movements of rotation of the two coaxial tubular members 11, 12 and of the ring-gears 6, 7 which are rigidly fixed thereto, with the result that all the bevel-pinions 5 which are in mesh with these two ring-gears undergo corresponding movements of rotation in either one direction or in the other, thereby producing different angular position-settings and consequently different values of pitch of the fan-blades 1. Thus, when the carriages 15 move in the direction of the arrows $f_1$ (as shown in FIG. 3), the outer tubular member 12 performs a pivotal movement in the direction of the arrow $f_2$ and the inner tubular member 11 performs a pivotal movement in the direction of the arrow $f_3$. In other words, these two tubular members in fact rotate in opposite directions. A displacement of the carriages in the other direction would produce opposite movements of rotation of the two tubular members in the opposite direction.

Figure 4:
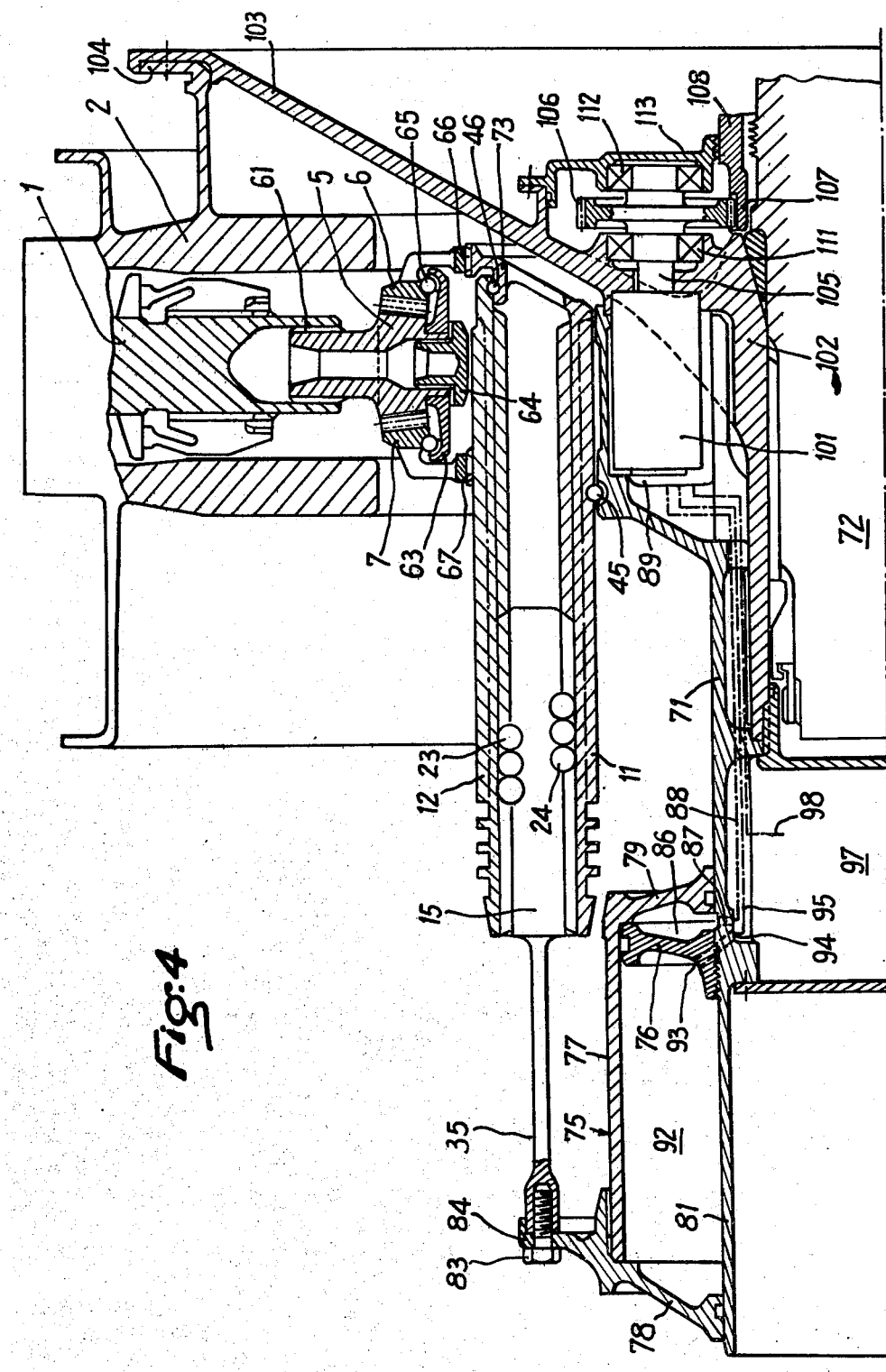
FIG. 4 is a longitudinal half-sectional view of one form of construction derived from the diagram of FIG. 1 and comprising a single central control jack.

A more elaborate form of construction is shown in FIG. 4 and the corresponding elements are designated by the same reference numerals as in FIGS. 1 to 3. Each bevel-pinion 5 is made fast for rotation with the corresponding blade foot 1 by means of a splined coupling 61. The meshing engagement of the ring-gears 6, 7 and of the pinion 5 is prestressed by means of a cup 63 which is fixed at the end on the hub of the bevel-pinion 5 by means of a threaded end-cap 64 and which exerts an axial pressure on the two rings 6, 7 by means of a row of balls 65. The two ring-gears 6, 7 are coupled for rotation respectively with the two tubular members 11 and 12 by means of splines designated respectively by the references 66, 67.

The ring of balls 47 for axial positioning of the inner tubular member 11 is retained within a groove of another tubular member 71 which is rigidly fixed to the fan-shaft 72 whilst the ring of balls 46 for axial positioning of the outer tubular member 12 is retained within a groove of an extension 73 of the inner tubular member 11, which is of larger diameter than this latter and also provided with splines 66 for coupling with the ring-gear 6.

The single axial control jack 75 is differently designed. The stationary member of the jack is the piston 76 which is secured to the tubular member 71 and this latter is fixed on the fan-shaft 72 whilst the moving member of the jack is the cylinder 77, the two ends 78, 79 of which slide respectively on the stationary tubular rod 81 of the piston 76 and on the tubular member 71. The rods 35 of the carriages 15 are all secured by means of screws 83 to an annular flange 84 which is integral with the cylinder end 78. The chamber 86 of the jack is connected to a distributor 89 by means of a hole 87 formed in the tubular member 71 and a duct 88. The other chamber 92 of the jack is also connected to the distributor 89 by means of a hole 93 formed in the piston, a hole 94 formed in the tubular member 71 and a duct 95. Said distributor 89 is also connected by means of a duct 98 to a chamber 97 which forms a collector-tank.

A pump 101 for supplying the jack with oil under pressure is mounted in another annular member 102 which is also fixed on the fan-shaft 72 and consequently rotates with this latter. Said member 102 is further provided with a flange 103 and this latter is connected by means of an annular flange 104 to the ring 2 which carries the fan blades. The shaft 105 of the pump carries a gear-wheel 106 disposed in meshing engagement with a ring-gear 107 which is rigidly fixed to a stationary tubular member 108 which freely surrounds the shaft 72, with the result that, during the rotation of the fan, the gear-wheel 106 rotates in mesh with the ring-gear 107 and drives the pump rotor in rotation. The external portion of the pump shaft 105 is centered in two ball-bearings 111, 112 mounted within two housings formed respectively within the member 102 and within a cover 113 which is fixed on said member. The pump 101 is obviously connected to the distributor by means of a duct (not illustrated).

The device hereabove described operates in the same manner as the device shown in FIG. 1 but differs therefrom in that the cylinder 77 of the jack 75 is capable of moving and not the jack piston as in the embodiment shown in FIG. 1.

Figure 5:
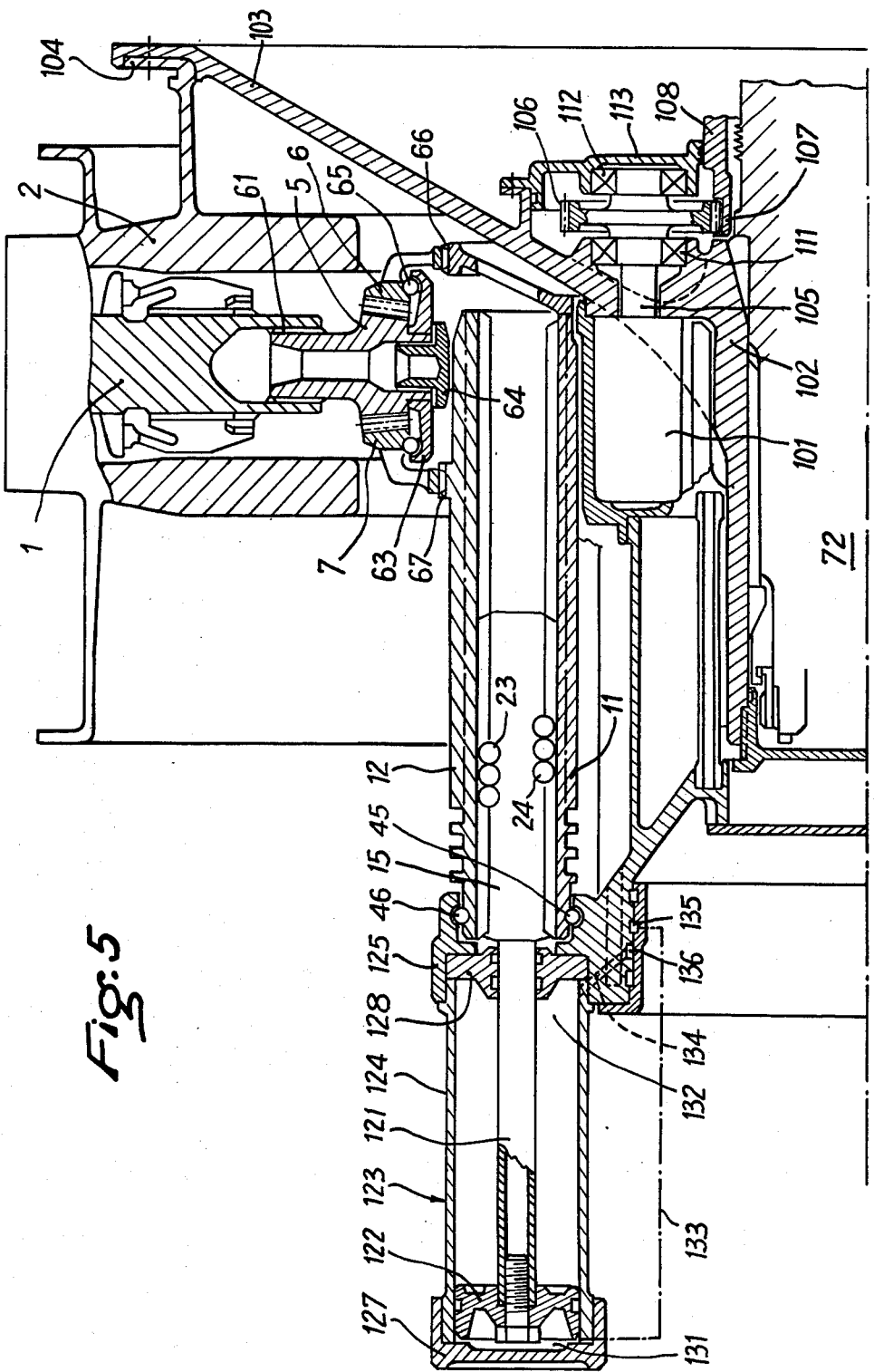
FIG. 5 is an axial half-sectional view of another form of construction comprising a plurality of control jacks disposed at intervals about the axis of the fan.

FIG. 5 illustrates another form of construction in which the different carriages 15 are no longer connected to a single control jack but are each connected to the rod 121 of the piston 122 of an individual jack 123. The cylinders 124 of all the jacks are therefore disposed at uniform intervals about the axis of the fan-shaft 72 and fixed against an annular member 125 which is rigidly fixed to said fan-shaft. The two cylinder ends of each jack are designated by the references 127, 128 respectively and the two corresponding chambers 131, 132 of each jack are connected respectively via a duct 133 and a hole 134 to two annular grooves 135, 136, said grooves being suitably connected to a distributor by means of circulation systems which are not illustrated in detail. The two rings of balls 45, 46 for axial positioning of the inner and outer tubular members 11 and 12 respectively are applied within grooves which are both formed in the annular member 125. The principle of operation of the device again remains the same.

It is readily apparent that the invention is not limited to the forms of construction which have been described with reference to the accompanying drawings but that, depending on the applications which are contemplated, modifications may accordingly be made without thereby departing from the scope of the invention.

I claim:

1. A device for controlling the variation in pitch of the blades of a fan carried by a rotary shaft, said device comprising:
    a bevel-pinion secured to each said blade;
    two bevel ring-gears coaxially arranged with respect to said shaft and permanently in mesh with all said bevel pinions on opposite sides thereof;
    two cylindrical tubular members arranged one inside the other coaxially about said shaft, the tubular members being spaced apart axially to form an annular space therebetween, the tubular members being coupled respectively for rotation with said two bevel ring-gears;
    a plurality of carriages adapted to move axially within said annular space and each carriage having a cylindrical external face and a cylindrical internal face located respectively opposite to the internal face of the outer cylindrical tubular member and to the external face of the inner cylindrical member, the carriages having a helical groove cut in each said face thereof, said grooves being set at opposite angles of slope on the two faces of the carriages, the outer cylindrical tubular member having helical grooves cut in the internal face thereof, the helical grooves in said outer cylindrical tubular member mating with said helical grooves in said cylindrical external faces of said carriages, the inner cylindrical tubular member having helical grooves cut in the external face thereof, the helical grooves in said inner cylindrical tubular member mating with said helical grooves in said cylindrical internal faces of said carriages;
    arrays of balls partially engaged in said helical grooves of said carriages and in said mating helical grooves of said cylindrical tubular members; and,
    at least one axial hydraulic jack, said jack having a stationary part rigidly fixed to said shaft and a movable part rigidly fixed to said carriages, one of said two parts being a cylinder and the other part being a piston mounted for reciprocating motion in said cylinder without rotary motion relative thereto, all of the helical grooves being positioned externally with respect to said cylinder.

2. The device of claim 1 and further comprising an additional tubular member located between said two cylindrical tubular members, said carriages being formed by predetermined zones of said additional tubular member.

3. The device of claim 1 and further comprising ball-return tracks located within the interior of said carriages.

4. The device of claim 1 wherein at least one jack is coaxial with said shaft.

5. The device of claim 1 and further comprising a plurality of axial hydraulic jacks disposed at uniform intervals about said shaft, each jack having a moving part to which at least one carriage is coupled.

6. The device of claim 1 wherein each of said two coaxial cylindrical tubular members is axially positioned with respect to said shaft by means of one of the arrays of balls, the arrays of balls being annular.

7. The device of claim 6 wherein said inner cylindrical tubular member is axially positioned by means of one of the annular arrays of balls while said outer cylindrical tubular member is axially positioned on said inner cylindrical tubular member by means of one of the annular arrays of balls.

8. The device of claim 1 and further comprising a rotary pump and a distributor to feed said hydraulic jack, said rotary pump being axially positioned and having a body which is rigidly fixed to said shaft and a pinion, said device comprising also an associated stationary ring-gear freely surrounding said shaft and meshing with said pinion of said pump.

* * * * *